United States Patent [19]

Lowery

[11] Patent Number: 4,457,527
[45] Date of Patent: Jul. 3, 1984

[54] UTILITY CART

[76] Inventor: A. J. Lowery, 867 Sandell, White Settlement, Tex. 76108

[21] Appl. No.: 327,172

[22] Filed: Dec. 3, 1981

[51] Int. Cl.³ .............................................. B62B 1/26
[52] U.S. Cl. .................................... 280/47.19; 182/20; 182/127; 242/86.5 R; 280/30; 280/47.28; 312/237
[58] Field of Search ............... 280/47.17, 47.19, 47.26, 280/33.99 T, 35, 79.3, 659, 47.18, 79.1 A, 30, 32.5, 47.27, 47.28, 47.29; 312/237, DIG. 33; 182/20, 127, 194, 228; 242/86.5 R, 129, 129.5, 129.6, 129.8

[56] References Cited

U.S. PATENT DOCUMENTS

| | | | |
|---|---|---|---|
| 2,016,421 | 10/1935 | Eichner | 248/225.1 |
| 2,514,849 | 7/1950 | Dewing | 280/35 |
| 2,819,938 | 1/1958 | Zerver | 280/79.3 |
| 2,883,731 | 4/1959 | Wells | 280/47.26 |
| 2,964,328 | 12/1960 | Muir | 280/47.26 |
| 3,087,740 | 4/1963 | Mitty et al. | 280/47.17 |
| 3,420,540 | 1/1969 | Bird | 280/47.26 |
| 3,436,093 | 4/1969 | Ruffley, Jr. | 280/47.27 |
| 3,734,526 | 5/1973 | Propst et al. | 280/33.99 T |
| 3,876,223 | 4/1975 | O'Reilly et al. | 280/47.19 |
| 3,908,831 | 9/1975 | Brendgord | 211/88 |
| 3,937,414 | 2/1976 | Bank et al. | 280/47.19 |
| 3,990,653 | 11/1976 | Marcell | 280/47.19 |
| 4,046,391 | 9/1977 | Restad | 280/47.27 |
| 4,165,088 | 8/1979 | Nelson | 280/79.3 |
| 4,288,134 | 9/1981 | Knaack et al. | 312/DIG. 33 |

*Primary Examiner*—David M. Mitchell
*Attorney, Agent, or Firm*—James E. Bradley

[57] ABSTRACT

A utility cart has features that allow it to be used over rough ground and stairways. The cart is a two wheel cart, with a base plate that projects forwardly for balancing the cart upright. The cart is rolled by tilting it rearwardly with handles. The cart has a back plate that is mounted across the frame and has a number of retainers for releasably retaining storage bins. Side plates are located on the sides of the base plate and back plate. The side plates have retainers for holding tools. Brackets on the insides of the side plates will receive a shaft for holding a spool of wire. The brackets will also receive a rung. The cart can then be used as a ladder. Braces extend rearwardly from the axle for facilitating moving the cart over stairways. A cover fits over the upper and front edges of the side plate to provide a secure enclosure. The cover can be moved to an open position where it will also serve as a temporary work table.

8 Claims, 8 Drawing Figures

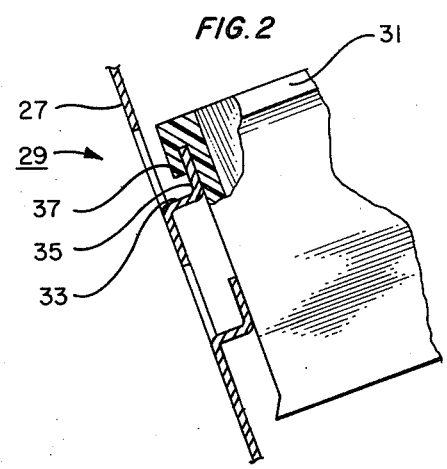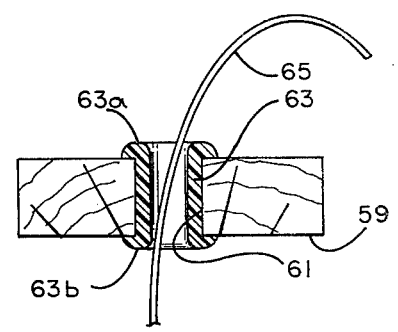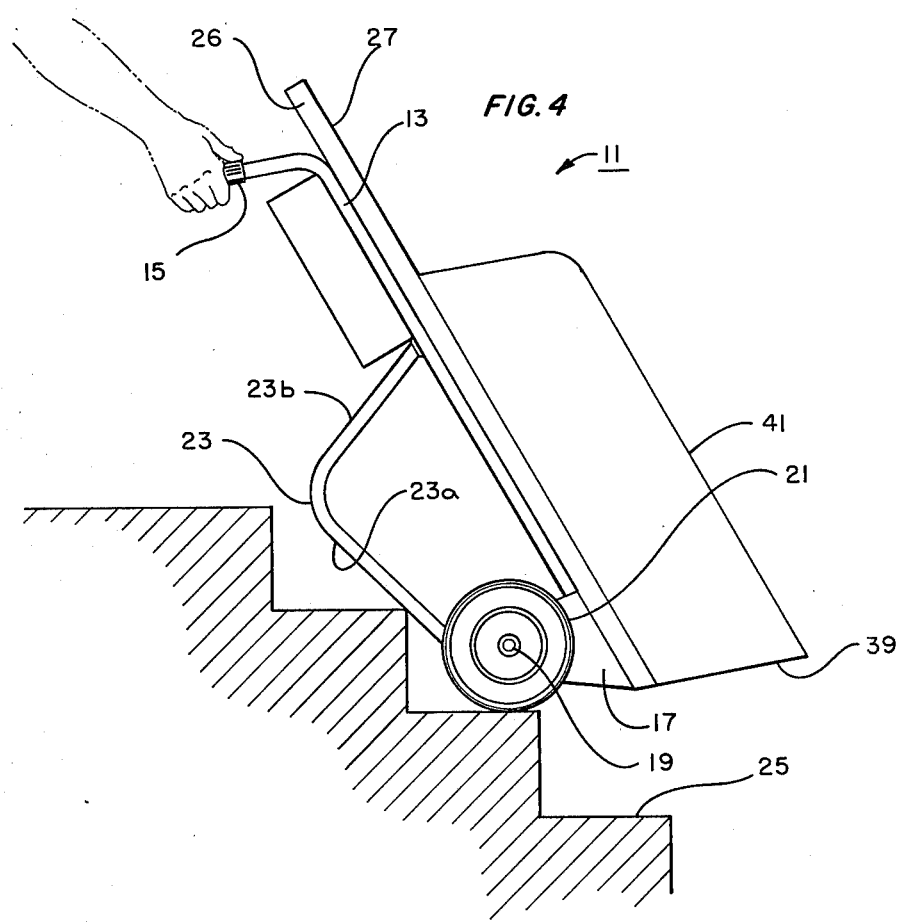

UTILITY CART

BACKGROUND OF THE INVENTION

This invention relates in general to utility carts, and in particular to a two wheel cart for carrying materials such as bins containing loose parts and spools of wire.

In construction, particularly commercial, extensive amounts of electrical contracting must be performed. Often, a trailer will be located at the site containing supplies such as wire, conduit, couplings, switches and the like. The electrician has to carry the material from a truck or trailer into the site for performing the wiring. The material may be carried by hand, or there may be devices used such as four wheel carts.

The ground is often rough due to the construction, plus there may be steps and other obstacles that make it difficult to roll a cart across the ground. Considerable time is wasted in hand carrying these materials. There are other uses for a cart that would carry many types of articles, and roll over rough ground and easily up and down steps.

SUMMARY OF THE INVENTION

In this invention, a two wheel cart is provided for carrying various types of articles. The cart includes a frame with a back plate mounted across the frame and extending upwardly. A base plate extends forwardly from the wheels for supporting the cart upright. Side plates are secured on each side of the base plate and to the back plate. The back plate has retaining means, preferably slots, for enabling bins to be clipped at various points. The bins contain loose small parts. The side plates also preferably have retainers for holding tools such as hammers, drills and the like.

The inside of each side plate has one or more brackets. These brackets are adapted to receive a shaft over which a spool of wire is carried. A wire guide extends across the top of the two side plates for guiding the wire from the spools. The shafts can be picked up easily to remove the spools. Rungs can be placed across the brackets to allow the cart to serve also as a short step ladder.

For ease in moving the cart over a stairway, braces extend from the axle rearwardly and upwardly. These braces slide over the edge of the stairway and are oriented so as to maintain the cart at a reasonably upward angle of inclination. Also, a cover may be used with the device. The cover has a top plate and a front plate that are hinged together and dimensioned to fit flush with the edges of the side plates. The front plate can be pivoted out co-planar with the top plate and braced to provide a work surface.

BRIEF DESCRIPTION OF THE DRAWINGS

FIG. 2 is a sectional view of the cart of FIG. 1, taken along the line II—II of FIG. 1.

FIG. 3 is a sectional view of the cart of FIG. 1, taken along the line III—III of FIG. 1.

FIG. 4 is a side view of the cart of FIG. 1, with some of the detail removed, and showing the cart on a stairway.

DESCRIPTION OF THE PREFERRED EMBODIMENT

Figure 1:
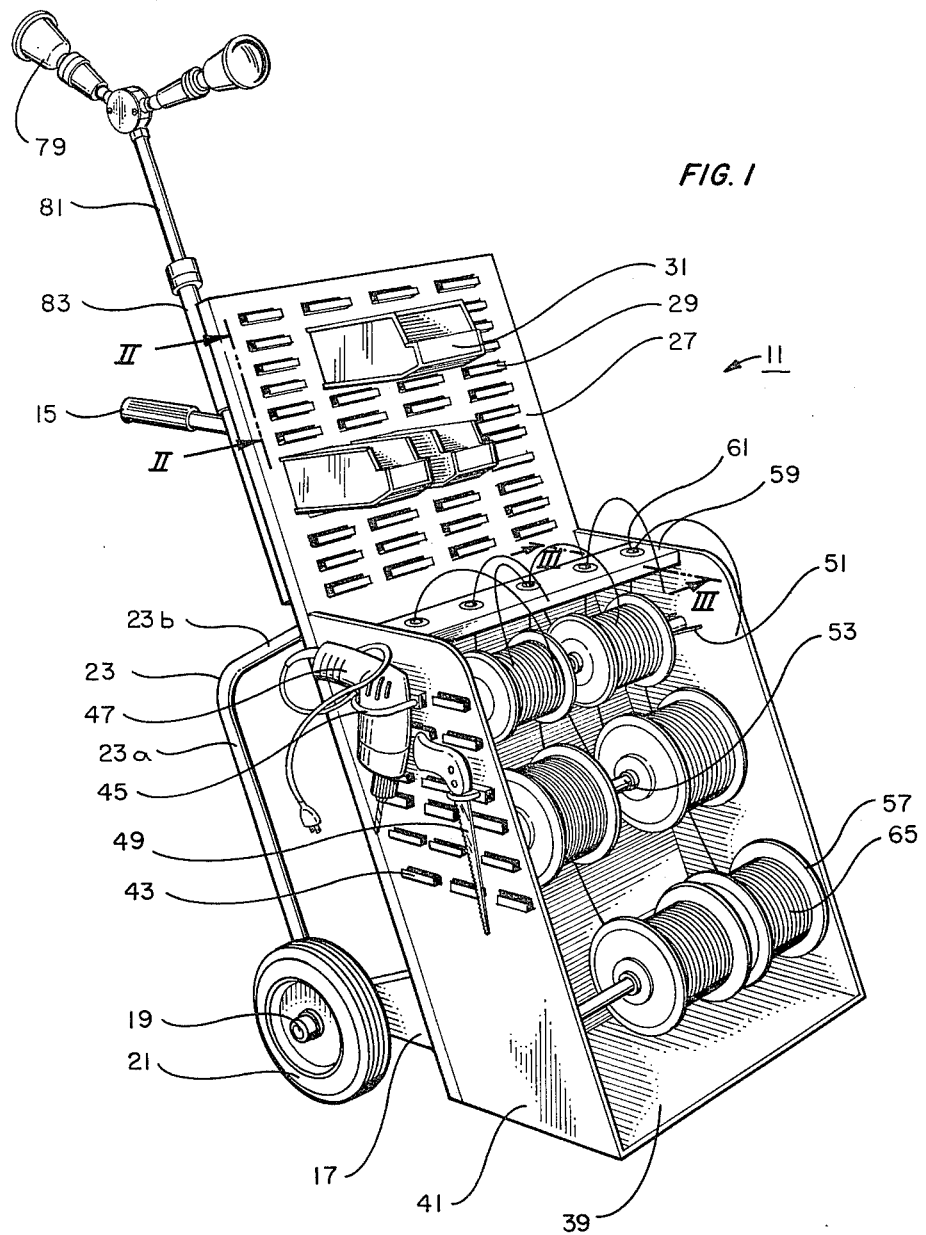
FIG. 1 is a perspective view of a cart constructed in accordance with this invention.

Referring to FIG. 4, cart 11 has a pair of upright frame members 13. Frame members 13 are parallel with each other and spaced-apart. The upper end of each frame member bends and extends rearwardly, terminating in a handle or hand grip 15. The lower ends of frame members 13 are connected to braces 17 which contain an axle 19. A wheel 21 is mounted on each end of axle 19.

A pair of braces 23, spaced-apart and parallel with other, extend rearwardly and upwardly from axle 19. Each brace 23 has a lower portion 23a and an upper portion 23b. Lower portion 23a is not parallel with frame members 13, rather inclines rearwardly at an angle in the range from 20 to 30 degrees with respect to frame members 13. The upper portion 23b extends forwardly and joins frame members 13 slightly above the mid point of each frame member 13. When proceeding up or down stairs 25, the lower portion 23a of each brace 23 will contact the corner of each stair 25 and support the cart 11 in a generally upright position. This allows the cart 11 to slide up and down stairs on the braces 23, without inclining the cart 11 substantially.

Figure 5:
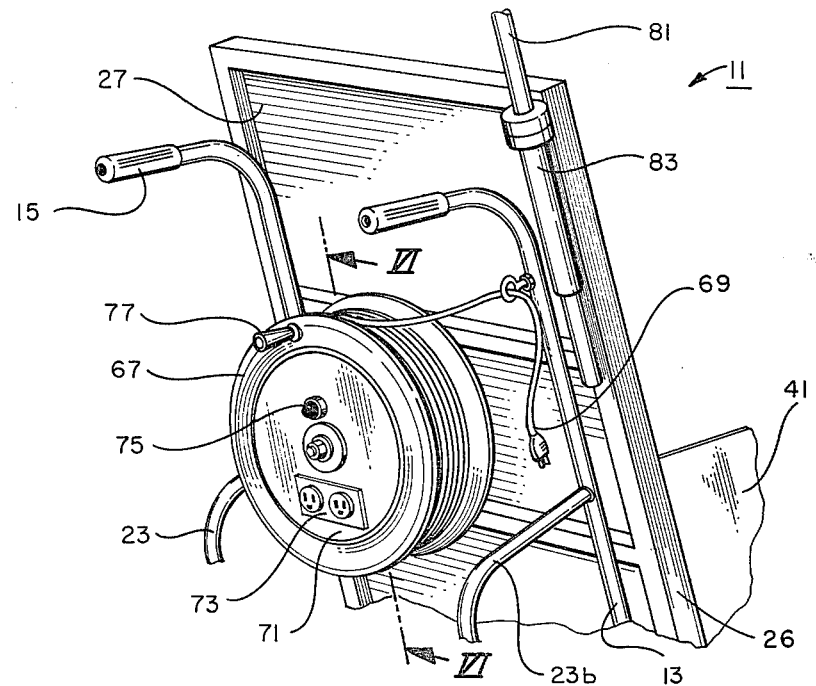
FIG. 5 is a perspective view as seen from the back of the cart of FIG. 1.

Referring to FIG. 5, a back plate 27 is mounted to a frame 26 and secured to frame members 13. Back plate 27 extends a short distance above handles 15 and is located in a plane that is parallel with axle 19. As shown in FIG. 1, back plate 27 is a rectangular metal plate containing rows of retaining means 29 for releasably retaining storage bins 31. Referring to FIG. 2, each retaining means comprises a slot 33 formed in plate 27. Slot 33 is rectangular, and the metal that was punched from slot 33 during the forming technique is bent into an outwardly and upwardly oriented flange 35. Flange 35 is adapted to receive an overhanging lip 37 of a storage bin 31.

Storage bins 31 are conventional and may be of various types. Generally, they are open topped, and have a forward sidewall that is shorter than the remaining sidewalls to facilitate entry into the bin. The back wall of each bin 31 rests against the flange 35 located immediately below the flange 35 that supports the bin.

Referring still to FIG. 1, a base plate 39 is secured to the forward edge of braces 17 and extends forwardly. The rearward edge of base plate 39 is forward of wheels 21 and below axle 19. As shown in FIG. 4, base plate 39 forms an obtuse angle of about 110 degrees with respect to frame members 13. When at rest, base plate 39 will contact the floor or ground surface, and support frame members 13 in an upright position, about 70 degrees with respect to the floor surface.

A pair of side plates 41 join base plate 39 and extend upwardly somewhat more than half the length of back plate 27. Side plates 41 have forward edges flush with the forward edge of base plate 39, and back edges that join the back plate 27. The back plate 27, base plate 39, and side plates 41 define an enclosure with an open front and top.

A plurality of retainers 43 are formed in the side plates. Retainers 43 are identical to retainers 29. Retainers 43 will support a storage bin 31, but it is preferred to mount holders 45 to them in the same manner as a storage bin 31. Holders 45 each have a lip (not shown) that engages the flange of the retainer 43. Each holder 45 has a holding member such as a loop of varying width for holding diverse tools such as the electrical drill 47 and saw 49. Some of the holders 45 will have other types of holding means such as hooks (not shown).

Figure 8:
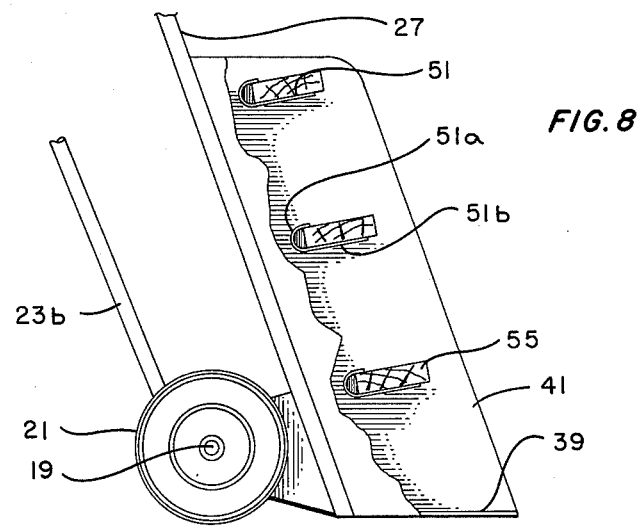
FIG. 8 is a side view of the cart of FIG. 1, shown with the spools being replaced by rungs.

One or more brackets 51 are secured to the inside surface of each side plate 41. Each bracket 51 has a supporting means for supporting a cylindrical shaft 53 or in place of shaft 53, a flat member or rung 55 (FIG. 8). Referring to FIG. 8, the supporting means of each bracket 51 includes a hook-shaped portion 51a at the rear of the bracket for closely receiving cylindrical shaft 53. The lower leg of hook portion 51 extends forwardly into a flat supporting surface 51b. Supporting surface 51b is located at an angle of about 80 degrees with respect to the frame members 13. As shown in FIG. 8, the brackets 51 are spaced-apart at equal distances. This enables the shaft 53 to be withdrawn, if desired, and replaced with flat boards or rungs 55. This results in a short step ladder. The brackets 51 on one side are at the same vertical distance from base plate 39 as on the other side so that the shafts 53 and rungs 55 are parallel with axle 19.

As shown in FIG. 1, shafts 53 are adapted to receive spools 57 of electrical cord or wire. A wire guide 59 is mounted between the two side plates 41 at their upper edges and above brackets 51. Wire guide 59 is parallel with axle 19 and contains a plurality of passages 61. Referring to FIG. 3, each passage 61 includes a sleeve 63 secured to the wire guide 59. Sleeve 63 has rounded upper and lower edges 63a and 63b. This avoids a sharp corner which might otherwise damage wire 65 as it is being pulled from a spool 57.

Figure 6:
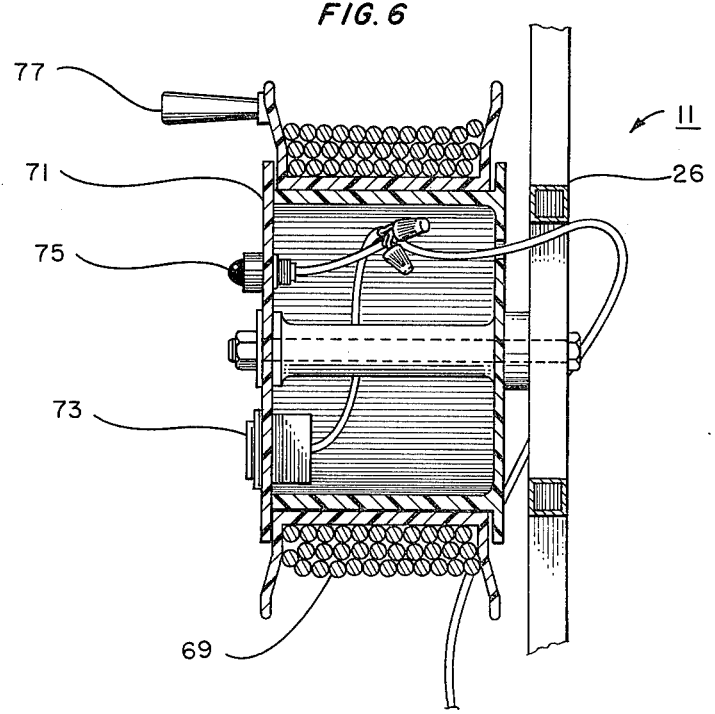
FIG. 6 is a sectional view of the cord reel located on the cart as shown in FIG. 5, and taken along the lines VI—VI of FIG. 5.

Referring to FIGS. 5 and 6, a reel 67 containing an electrical extension cord or wire 69 is mounted to the rearward side of back plate 27. As shown also in FIG. 6, reel 67 is rotatably carried on a stationary hub 71 that is bolted to frame 26. Hub 71 has an electrical outlet 73 and a lamp 75 indicating when power is supplied to electrical outlet 73. A handle 77 facilitates the winding of wire 69 back onto reel 67.

Referring again to FIG. 1, a pair of lamps 79 are mounted to the rearward side of backplate 27. Lamps 79 are electrically connected with outlet 73 (FIG. 6). Lamps 79 are mounted on a pole 81 that telescopes within a holder 83. This allows the lamps to be positioned at various heights for optimal illumination.

Figure 7:
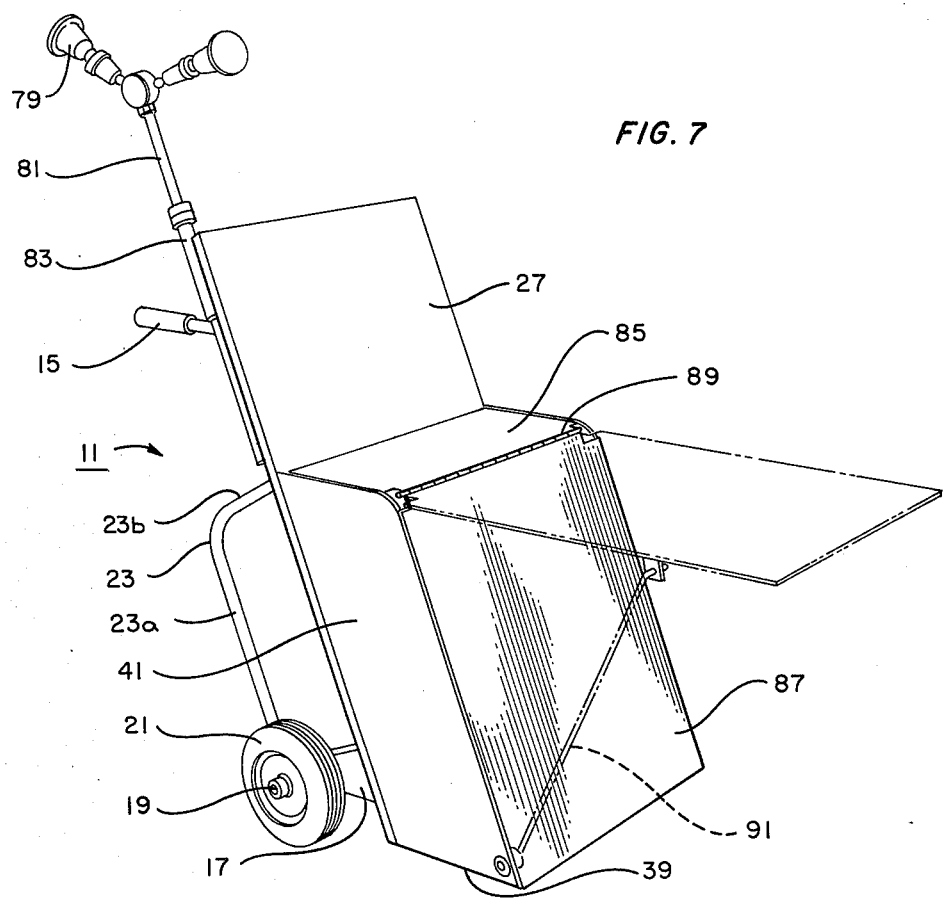
FIG. 7 is a perspective view of the cart of FIG. 1, shown with a cover, and with some of the detail removed.

An optional feature is shown in FIG. 7. This feature comprises a cover for securing to the side plates 41 to enclose any material located inside. The cover includes a top plate 85 that is mountable on the upper edges of side plates 41 and flush with back plate 27. The plate 85 is located in a plane parallel with base plate 39. Top plate 85 is secured by a releasable clip or retainer (not shown) to back plate 27. A front plate 87 is connected by a hinge 89 to top plate 85. Front plate 87 is a rectangular plate having a lower edge adapted to fit flush with the base plate 39, and side edges for fitting flush with side plates 41. A lock (not shown) will lock the front plate 87 in the closed position, shown in the solid lines of FIG. 7. Hinge 89 allows the front plate 87 to swing upwardly co-planar with top plate 85, as shown in the phantom lines in FIG. 7. A brace 91 will support the top plate 85 in the horizontal position for providing a portable working surface.

The axle 19 is positioned so that when the cart is tilted back for normal movement, the center of gravity of the cart will be located generally above axle 19. This balance of the weight forward and rearward of axle 19 avoids excessive downward force at handles 15, making the cart easy to move.

In operation, if used at a construction site by an electrician, the electrician will place bins 31 on the back plate 27, tools on the side plates 41 and wire spools 57 on shafts 53. He will then tilt the cart rearward on axle 19 and roll the cart 11 to the place where he begins work. The extension cord 69 is unreeled and connected to a power source. The worker plugs his electrical tools into the outlet 73. When it is necessary to string electrical wire 65, he pulls the wire through the passages in the wire guide 59 and inserts it into conduit in the building. If a short step ladder is needed, the user can simply pick up the shafts 53, set them aside, and place rungs 55 on the brackets 51. The user can then use the device as a step ladder.

If the user elects to utilize a cover as shown in FIG. 7, he can use the front plate 87 as a work surface when unlocked and supported in the horizontal open position. If the user needs to go up or down stairs, as shown in FIG. 4, the rearwardly protruding braces 23 support the members 13 at a fairly high angle of inclination, avoiding spillage of any of the contents from the bins 31. This also makes it easier for the user to move the cart 11 up and down stairs since he will not have to bend over as much as he would with a cart that lacked these braces 23.

The invention has significant advantages. The cart will roll over rough ground and up and down stairways. The cart provides places for storing loose parts, spools of wire, and tools. The cart can be used also as a ladder. A cover will provide security as well as a portable work bench.

While the invention has been shown in only one of its forms, it should be apparent to those skilled in the art that it is not so limited but is succeptible to various changes and modifications without departing from the scope of the invention.

I claim:

1. In a utility cart of the type having a frame mounted on an axle on a pair of wheels, the cart having a base plate projecting forwardly of the axle and positioned to contact the ground and support the cart in an upright position, the cart having a rearwardly extending handle for tilting the cart about the axle and moving the cart, the improvement comprising:

a back plate mounted across the frame, the back plate having a plurality of retaining means for releasably retaining bins for storing material;

a pair of spaced-apart side plates extending forwardly from the back plate, the side plates having a plurality of retaining means for releasably retaining goods; the side plates extending upwardly from the base plate in planes perpendicular to the back plate and to the base plate;

at least one bracket mounted to the inside surface of each side plate;

a shaft extending between the brackets parallel with the axle for holding spools of cord;

the frame having a pair of parallel rigid braces extending upwardly and rearwardly from the axle with respect to the back plate, the brace having a lower portion inclining rearwardly with respect to the frame and an upper portion extending forwardly and joining the frame;

a top plate extending forwardly from the back plate flush with the upper edges of the side plates;

a front plate connected by a hinge to the forward edge of the top plate and adapted to pivot between a closed position flush with the forward edges of the side plates and a horizontal open position; and brace means for releasably supporting the front plate in the open position.

2. In a utility cart of the type having a frame mounted on an axle on a pair of wheels, the cart having a base plate projecting forwardly of the axle and positioned to contact the ground and support the cart in an upright position, the cart having a rearwardly extending handle for tilting the cart about the axle and moving the cart, the improvement comprising:

a back plate mounted across the frame, the back plate having a plurality of retaining means for releasably retaining bins for storing material;

a pair of spaced-apart side plates extending forwardly from the back plate, the side plates having a plurality of retaining means for releasably retaining goods; the side plates extending upwardly from the base plate in planes perpendicular to the back plate and to the base plate;

a plurality of brackets vertically spaced-apart and mounted to the inside surface of each side plate;

a shaft extending between at least two of the brackets parallel with the axle for holding spools of cord;

the frame having a pair of parallel rigid braces extending upwardly and rearwardly from the axle with respect to the back plate, the brace having a lower portion inclining rearwardly with respect to the frame and an upper portion extending forwardly and joining the frame;

a top plate extending forwardly from the back plate flush with the upper edges of the side plates;

a front plate connected by a hinge to the forward edge of the top plate and adapted to pivot between a closed position flush with the forward edges of the side plates and a horizontal open position;

brace means for releasably supporting the front plate in the open position;

each of the brackets on one side plate being spaced at the same distance from the base plate as one of the brackets on the other side plate;

each of the brackets having a supporting means for supporting selectively the shaft for a spool of wire and also a rung to define a ladder.

3. In a utility cart of the type having a frame mounted on an axle on a pair of wheels, the cart having a base plate projecting forwardly of the axle and positioned to contact the ground and support the cart in an upright position, the cart having a rearwardly extending handle for tilting the cart about the axle and moving the cart when tilted, the improvement comprising:

a back plate mounted across the frame parallel with the axle, the back plate having a plurality of retaining means for releasably retaining bins for storing materials;

a pair of spaced-apart side plates carried by the frame and extending forwardly of the back plate and upwardly from the base plate, the side plates having a plurality of retaining means for releasably retaining goods;

at least one bracket mounted to the inside surface of each side plate;

a shaft supported by the bracket for receiving a spool of electrical wire; the axis of the shaft being parallel with the axle; and a wire guide extending between the side plates above the shaft, the wire guide being an elongated member parallel with the shaft and having a plurality of passages for wire from the spool to feed through.

4. The cart according to claim 3 wherein each of the retaining means for the back and side plates comprises a slot having a forward and upwardly turned flange for receiving an overhanging lip.

5. The cart according to claim 3 wherein the back plate extends above the upper edge of the side plates, and the side plates have forward edges flush with the base plate.

6. The cart according to claim 3 wherein each of the passages has rounded upper and lower edges.

7. A utility cart, comprising in combination:

a pair of spaced-apart, parallel frame members mounted to and forwardly of an axle, the upper ends of the frame members extending rearwardly for defining handles;

a wheel mounted to each end of the axle;

a pair of rigid braces secured to the axle and extending upwardly, the braces having a lower portion inclining rearwardly with respect to the frame member and an upper portion that joins the frame members;

a base plate mounted to the lower ends of the frame members and extending forwardly, the base plate being positioned to contact the ground surface and support the cart in an upright position;

a back plate secured to the frame members and extending upward to a height no less than the handles;

a pair of side plates parallel with each other and located on each side of the base plate, each side plate extending upwardly from the base plate perpendicular to the back plate and base plate;

the back plate having a plurality of slots, each slot having a forwardly and upwardly projecting flange for engaging the lip of a bin for storing articles;

at least one bracket mounted to the inside surface of each side plate;

a shaft supported by the bracket for receiving a spool of electrical wire; and a wire guide extending between the side plates above and parallel with the shaft, the wire guide being an elongated member having a plurality of passages for wire from the spool to feed through, each passage having a rounded upper edge.

8. In a utility cart of the type having a frame mounted on an axle on a pair of wheels, the cart having a base plate projecting forwardly of the axle and a rearwardly extending handle for tilting the cart about the axle and moving the cart, the improvement comprising:

a back plate mounted across the frame, the back plate having a plurality of retaining means for releasably retaining bins for storing material; and a pair of spaced-apart side plates mounted to the frame to the back and base plates and extending forwardly, the side plates having a plurality of retaining means for releasably retaining goods;

a plurality of brackets vertically spaced apart and mounted to the inside surface of each side plate; and at least one shaft extending between two of the brackets parallel with the axle for holding spools of wire;

the frame having a pair of parallel braces extending upwardly and rearwardly from the axle with respect to the back plate;

a top plate extending forwardly from the back plate flush with the upper edges of the side plates;

a front plate connected by a hinge to the forward edge of the top plate and adapted to pivot between a closed position flush with the forward edges of the side plates and a horizontal open position;

brace means for releasably supporting the front plate in the open position;

each of the brackets on one side plate being spaced at the same distance from the base plate as one of the brackets on the other side plate; and each of the brackets having a supporting means for supporting selectively the shaft for holding spools of wire and also a rung to define a ladder.

* * * * *